July 19, 1960
R. BOISSONNAULT
2,945,254
RUNWAY SWEEPER
Filed Oct. 7, 1957
6 Sheets-Sheet 1
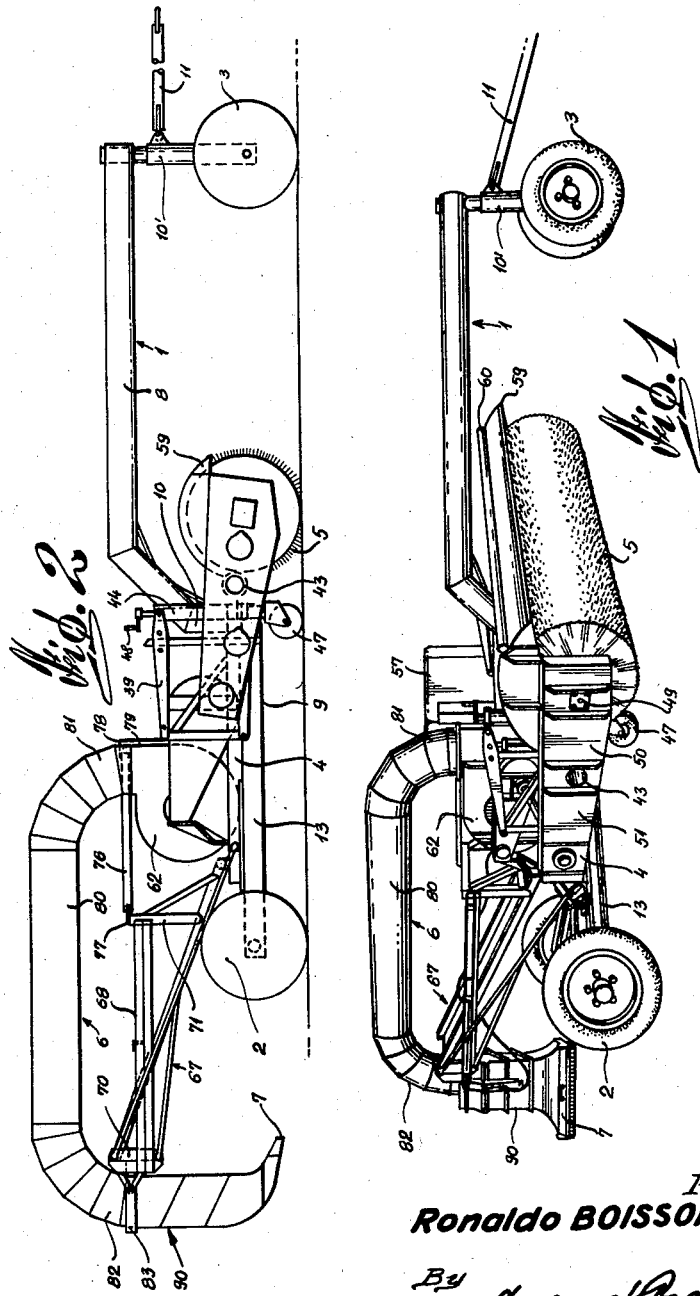
Inventor
Ronaldo BOISSONNAULT
By
Attorneys

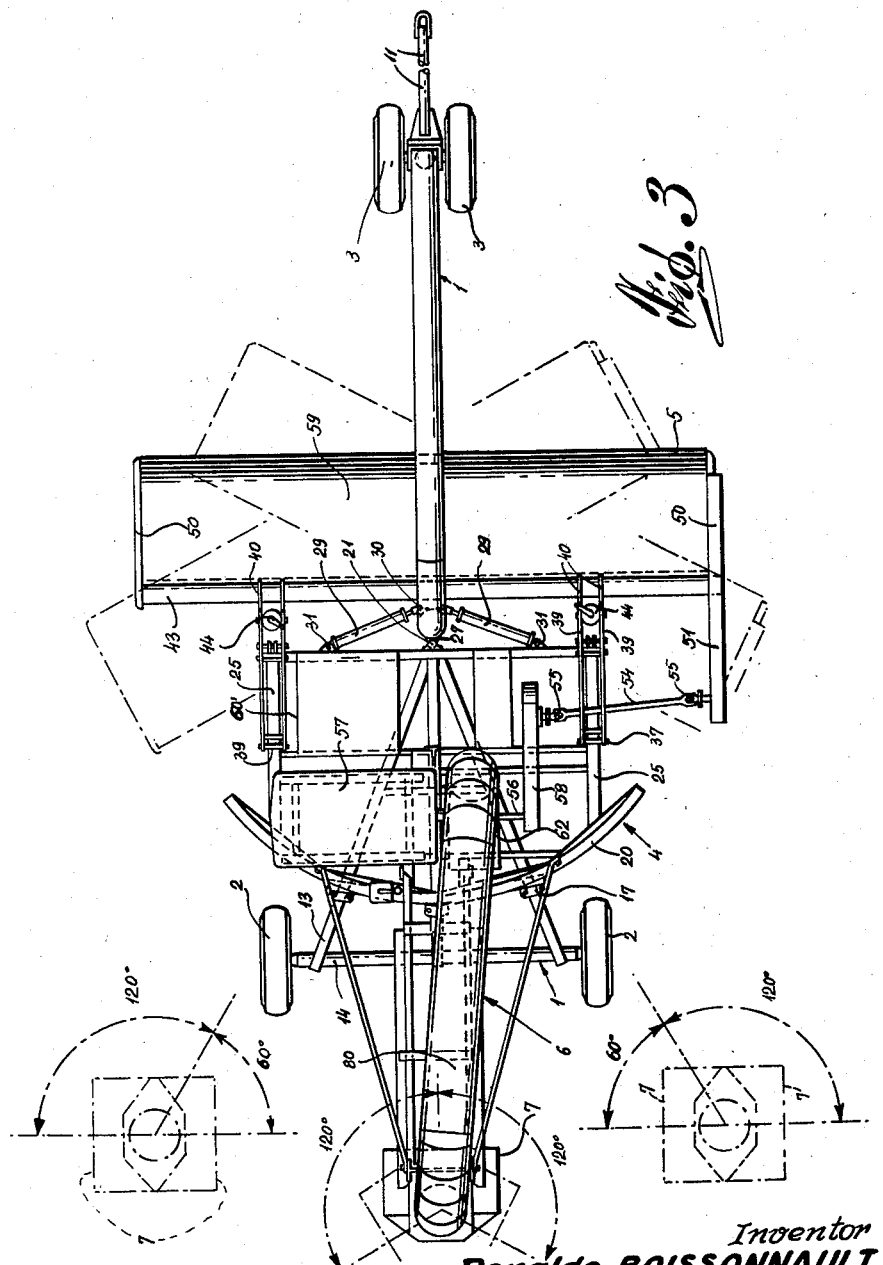

July 19, 1960 R. BOISSONNAULT 2,945,254
RUNWAY SWEEPER
Filed Oct. 7, 1957 6 Sheets-Sheet 3
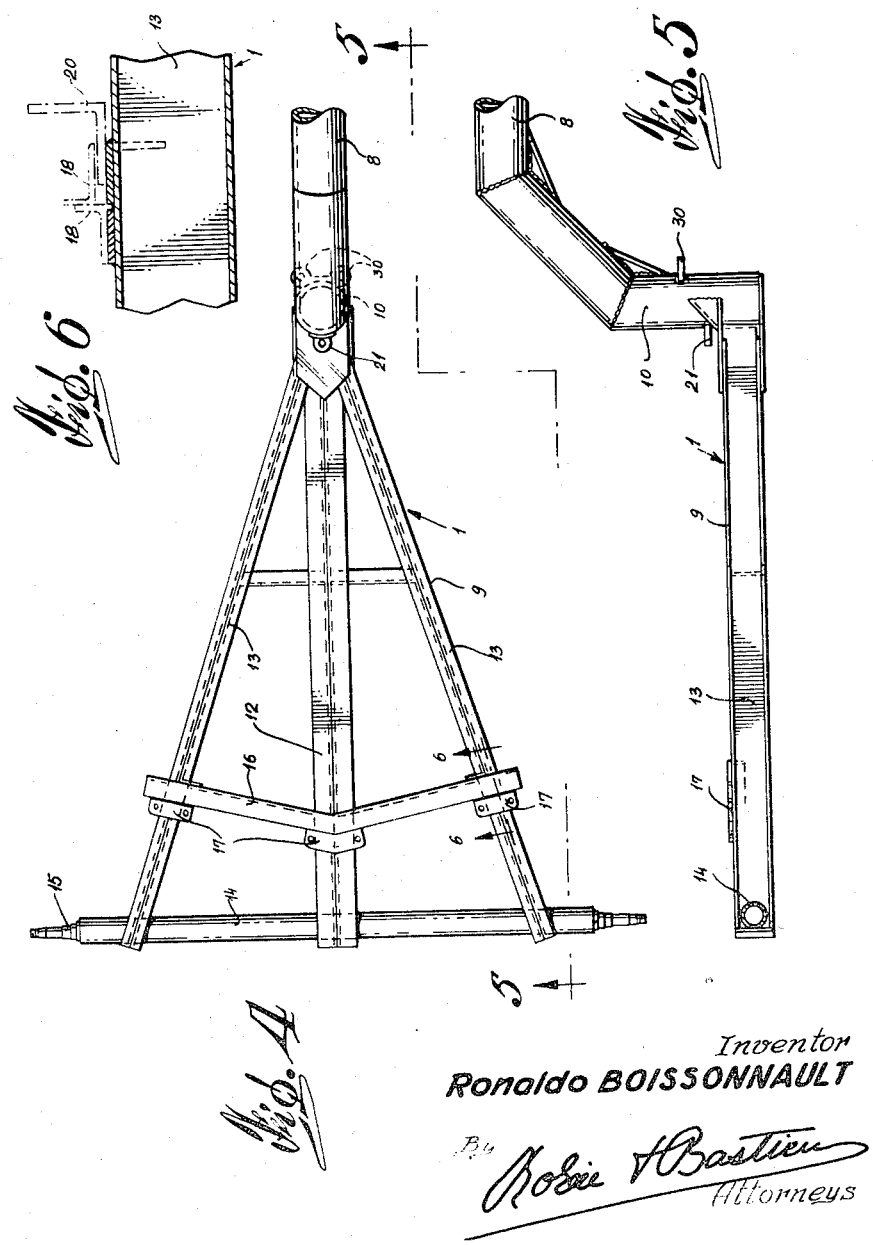
Inventor
Ronaldo BOISSONNAULT

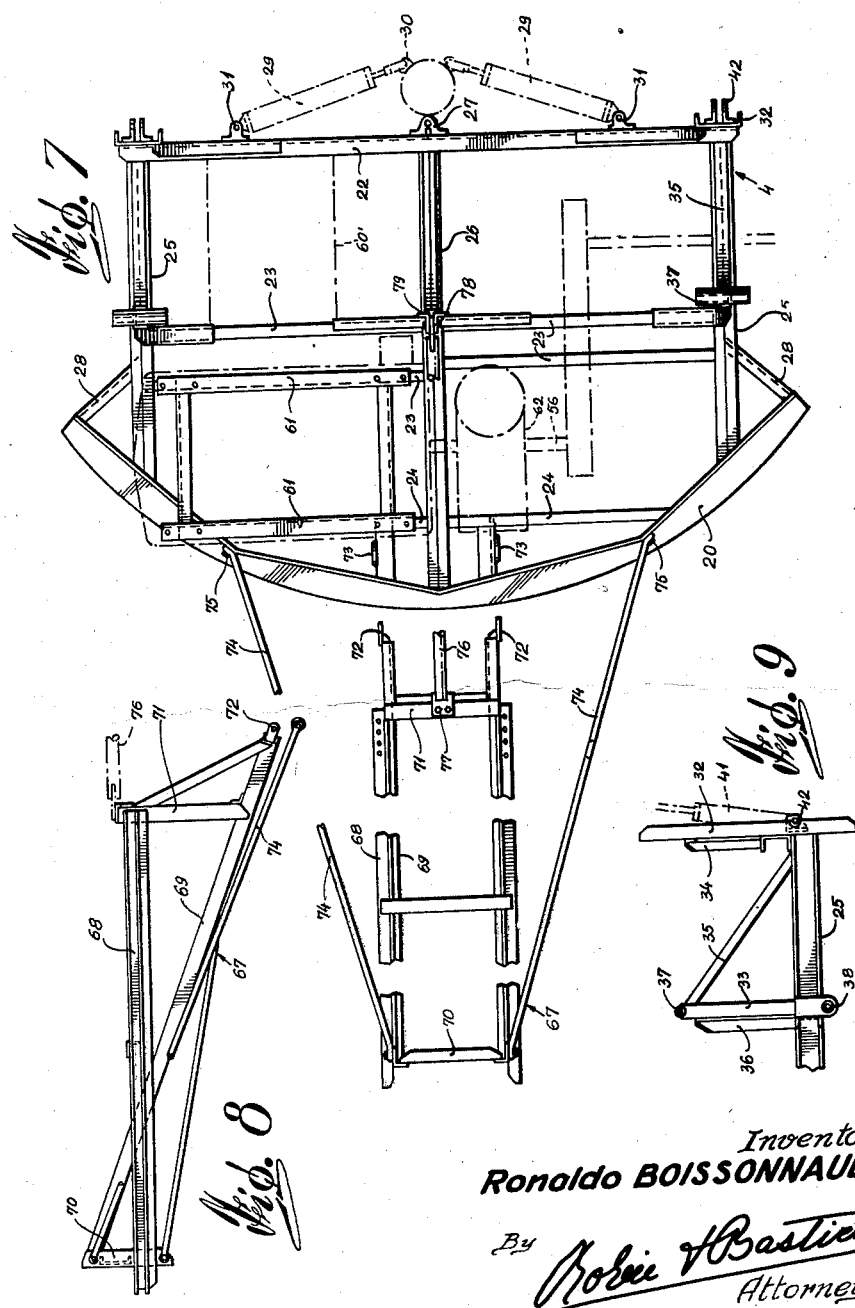

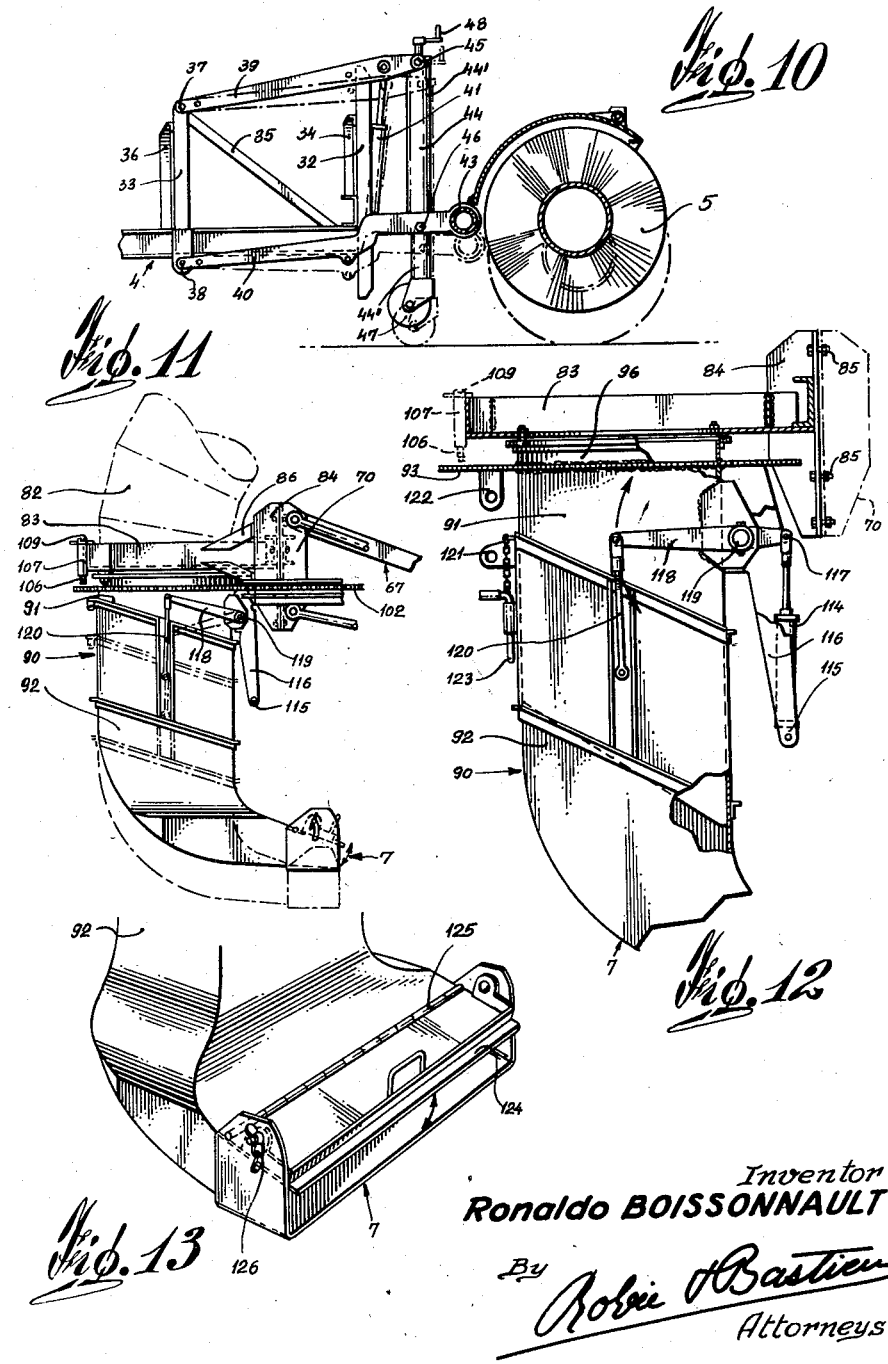

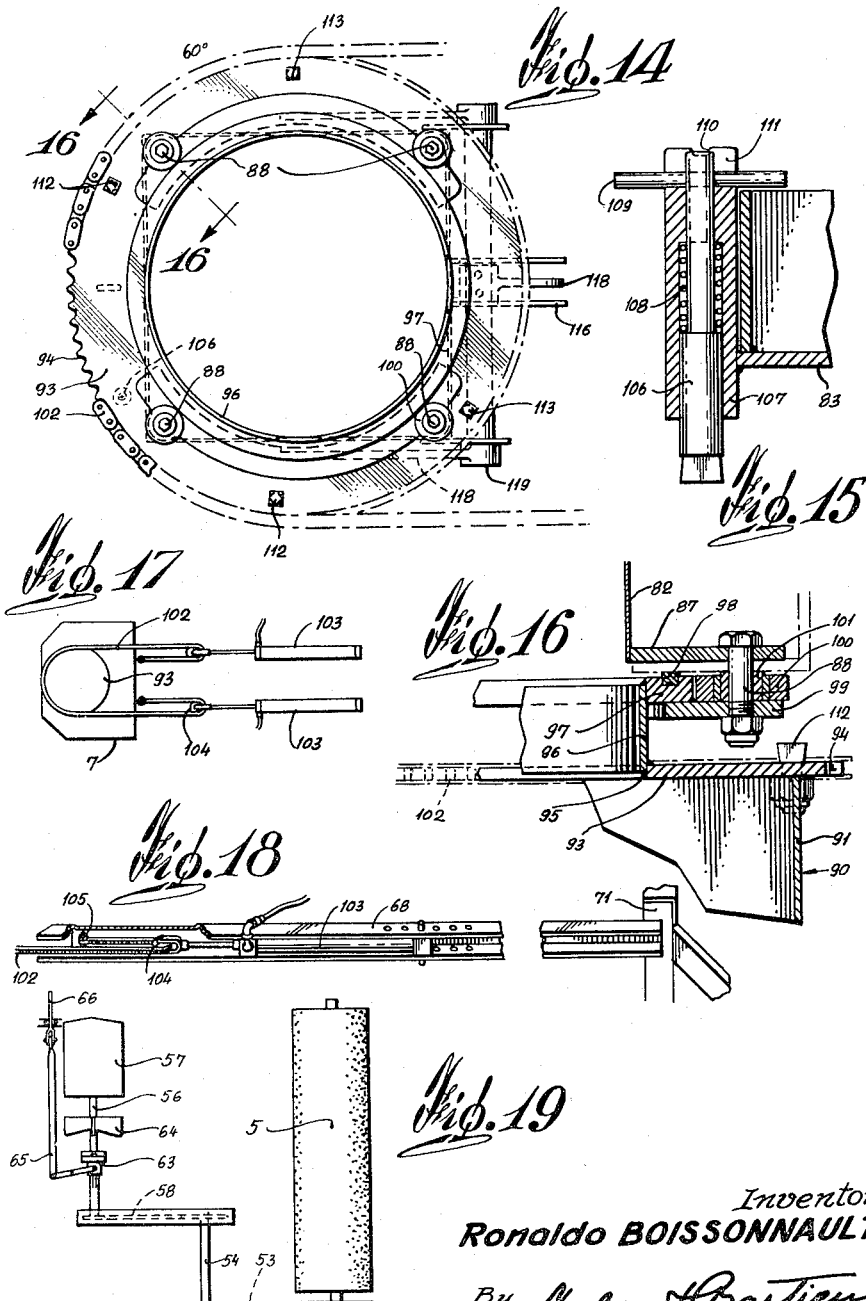

United States Patent Office 2,945,254
Patented July 19, 1960

2,945,254
RUNWAY SWEEPER

Ronaldo Boissonnault, Montreal, Quebec, Canada, assignor to Sicard Inc., Montreal, Quebec, Canada Filed Oct. 7, 1957, Ser. No. 688,767

13 Claims. (Cl. 15—328)

The present invention relates to a machine for simultaneously sweeping a road surface or the like and blowing loose particles therefrom. The machine, in accordance with the present invention, is more particularly suited for cleaning runways at airports and is devised as a trailer type machine adapted to be pulled by a motor vehicle and to be entirely and automatically operated from the driver's seat in the motor vehicle.

The general object of the present invention is the provision of a combined sweeping and blowing machine of the character described in which the air discharge nozzle of the blower is arranged to take a position at one side of the path of the rotary brush or broom so as to discharge an air blast across substantially the entire width of the path which has been swept by the brush to clean or remove any loose particles remaining on the road surface after passage of the brush, and this irrespective of the direction of the angular position assumed by the brush with respect to the long axis of the wheeled frame on which the brush and blower are mounted.

Another important object of the present invention is the provision of a machine of the character described in which the blower nozzle is mounted for rotation about its vertical axis so as to be adapted to blow air outwardly of the machine so as to clean objects on the side of the roadway such as runway side lights.

Yet another important object of the present invention is the provision of a machine of the character described in which the blower, blower housing and blower nozzle, together with the rotary brush, are mounted on a subframe which is itself pivotally mounted on the wheeled frame of the machine so that both the rotary brush and blower nozzle move as a unit with respect to the long axis of the wheeled frame.

Still another important object of the present invention is the provision of a machine of the character described in which both the rotary brush and the air nozzle are mounted for vertical movement with respect to the subframe so as to take an out-of-the-way inoperative position when not in use.

Another important object of the present invention is the provision of a machine of the character described in which the driving shaft of the engine mounted on the subframe serves to operate both the blower and the rotary brush.

Another important object of the present invention is the provision of a machine of the character described in which all the movable parts are operated by a hydraulic cylinder and piston system which is itself controlled from the driver's seat of the motor vehicle pulling the machine, whereby the sweeping operation may be easily reversed, thus always sweeping in the direction of the wind.

The foregoing and other important objects of the present invention will become more apparent during the following disclosure and by referring to the drawing in which:

Figure 1 is a perspective view of the combined sweeping and blowing machine;

Figure 2 is a side elevation of the same;

Figure 3 is a plan view of the same showing, in dotted lines, the various angular positions of the rotary brush and the blower nozzle;

Figure 4 is a partial plan view of the wheeled frame;

Figure 5 is a cross-sectional elevation along line 5—5 of Figure 4;

Figure 6 is a detailed cross-section along line 6—6 of Figure 4;

Figure 7 is a plan view of the subframe together with the rear extension for supporting the air duct and blower nozzle;

Figure 8 is a side elevation of the extension;

Figure 9 is a partial side elevation of the front part of the subframe;

Figure 10 is a side elevation similar to that of Figure 9, but showing the rotary brush and caster assembly mounted thereon;

Figure 11 is a side elevation of the blower head;

Figure 12 is an enlarged detailed view of the blower head showing the means for raising and lowering the lower section of the same;

Figure 13 is a perspective view of the air nozzle;

Figure 14 is a top plan of the blower head;

Figure 15 is a longitudinal section of the locking bolt for selectively limiting the angular movement of the blower head with respect to the machine;

Figure 16 is a cross-section on line 16—16 of Figure 14;

Figure 17 is a schematic plan view of the means for rotating the blower head;

Figure 18 is a perspective view of one hydraulic cylinder and piston unit for rotating the blower head; and Figure 19 is a schematic plan view of the arrangement for driving the rotary brush and the fan of the blower.

Referring now more particularly to the drawings in which like reference characters indicate like elements throughout, the machine, in accordance with the present invention, essentially consists of a main frame 1 mounted on a pair of back wheels 2 and front wheels 3 and supporting a subframe 4, on which are mounted the rotary sweeping brush 5 and the blower system 6 having an air discharge nozzle 7.

The main or wheeled frame 1 is more particularly shown in Figures 1 and 4 to 6 inclusive. It comprises a forwardly and horizontally extending elevated portion 8 of tubular construction which is joined and is rigidly secured to a rearward portion 9 by means of a vertical leg 10. The front pair of wheels 3 are steering wheels and are mounted on a telescopic system 10′ which is vertically mounted at the front end of the forward beam 8. The steering device 10′ is provided with a drawbar 11 for attachment to a motor vehicle for towing the entire machine. Portion 8, leg 10 and telescopic system 10′ thus form essentially a vertically disposed inverted U-shaped front beam portion.

The rear portion 9 of the wheeled frame 1 comprises a longitudinal beam 12 and angularly directed braces 13. The rear end of the braces 13 and beam 12 are secured to a transverse housing 14 inside of which is disposed the rear axle 15 of the rear wheels 2 of the machine. A slideway 16 is rigidly secured on top of the beam 12 and braces 13. The elements 17, shown in Figure 4, are brackets for securing the angle iron members 18, shown in dot and dash line in Figure 6, which serve as retaining members for the arcuate segment member 20 of the subframe so that said segment member may slide on the slideway 16. A bracket 21, which is secured to the lower end of the leg 10, serves as the pivotal connection for the subframe on the wheeled frame.

The subframe 4, more particularly shown in Figure 7, has a generally rectangular shape and comprises a front transverse beam 22, intermediate transverse beams 23 and a rear transverse beam 24 which are connected by lateral beams 25 and a central beam 26.

A front central bracket 27 is secured to the middle of the front transverse beam 22 and is adapted to be pivotally connected to the pivotal connection 21 of the wheeled frame 1. The segment member 20 is secured at the back of the subframe to the lateral beams 25 and central beam 26 and is reinforced by means of braces 28.

As indicated previously, the subframe 4 is adapted to be mounted on top of the rear portion 9 of the wheeled frame 1 with the segment member 20 engaging the slideway 16 and supported thereby and with the pivotal connection 27 and 21 in engagement. Thus, the subframe may pivot with respect to the wheeled frame through an angle of approximately 30° or more on each side of the long axis of the wheeled frame. The pivotal movement is obtained by means of the hydraulic cylinder and piston units 29 pivotally connected to brackets 30 on the leg 10 of the front beam and to front brackets 31 on the front transverse beam 22 of the subframe.

The rotary brush 5 is mounted forwardly of the subframe 4 and transversely of the machine underneath the elevated front beam 8 of the wheeled frame 1. The brush turns in a horizontal plane together with the subframe and means are provided for lowering and raising the brush with respect to the subframe and vehicle.

Referring to Figures 7, 9 and 10, it will be seen that the forward portion of each outside lateral beam 25 of the subframe 4 is provided with front and back upright members 32 and 33 respectively, which are strengthened by brace members 34, 35 and 36. The back member 33 provides, at both ends thereof, journals 37 and 38 for a pair of upper arms 39 and lower arms 40 respectively. The upper arms 39 extend on both sides of the front upright member 32 and are pivotally connected to the piston rod head of a hydraulic piston and unit 41, the lower end of which is pivotally connected by means of a bracket 42 (see Figure 7) to the subframe 4. The pair of lower arms 40 extend on both sides of the lateral beam 25 of the subframe, underneath the front transverse beam 22 and forwardly of the subframe. The two pairs of lower arms 40 are connected to and support a transverse tubular member 43 which extends across the entire width of the rotary brush 5 rearwardly thereof, as clearly shown in Figure 3.

The lower arms 40 and tubular member 43 are suspended from the pairs of upper arms 39 through the intermediary of caster wheel assemblies, generally indicated at 44, and more particularly described and claimed in a copending application Serial Number 688,740, filed October 7, 1957, entitled "Preloaded Caster," now abandoned. The upper arms 39 are pivoted at 45 to the outer tubular member 44' of the caster wheel assembly 44 and the pair of lower arms 40 are pivotally connected at 46 to said same outer tubular member of the caster wheel assembly. The inner tubular member 44" of the caster wheel assembly is telescopically engaged in the outer tubular member and supports a caster wheel 47 which is adapted to engage the ground and support the rotary brush at a predetermined level which is adjusted by the crank handle 48.

It will be seen that the upright member 33, together with the upper arms 39, lower arms 40 and caster wheel assembly 44 constitute a deformable parallelogram arrangement which, when the hydraulic cylinder and piston unit 41 is inactive, is free to pivot so that the brush may follow the contour of the road surface under the support afforded by the caster wheels 47. This parallelogram arrangement also always maintains the caster wheel assemblies in a vertical position. Whenever it is desired to raise the brush 5 into an out-of-the-way position, the hydraulic cylinder and piston units 41 are actuated to lift the upper arms 39.

As shown in Figures 1 and 3, the shaft of the rotary brush 5 is pivoted at 49 on lateral members 50 which are rigidly secured to the transverse tubular member 43. One lateral member 50 is extended rearwardly, as shown at 51, to serve as a support and as a housing for the speed reducing chain transmission unit 53 (see Figure 19) between the rotary brush 5 and the intermediary shaft 54 which is provided with universal joints 55. The shaft 54 is in turn connected to the drive shaft 56 of the engine 57 through the provision of a speed reducing chain transmission unit 58.

The brush 5 is provided with a mudguard 59 extending over the top thereof and supported by and secured to the lateral frame members 50, as shown in Figure 1. The mudguard 59 is preferably provided with a water spraying tube 60 for spraying water in front of the advancing rotary brush, for use in non-freezing weather. A water reservoir (not shown) is mounted on the forward beam 8 of the wheeled frame 1 and is connected to the tube 60 through the control valve located in the box 60', also mounted on the subframe 4.

The engine 57, which is preferably an internal combustion gasoline engine, is mounted at the back of the subframe 4 transversely thereof and on one side of the subframe. Said engine is supported on a bed 61, shown in Figure 7, which is secured to beams 23 and 24. Said engine incorporates a conventional clutch (not shown) which is declutched to start the engine under no load condition. The drive shaft 56 of the engine extends through the blower housing 62 and is provided with an additional clutch 63 (see Figure 19) disposed intermediate said drive shaft and the chain transmission 58. The fan 64 of the blower housing 62 is directly mounted on the drive shaft 56. Upon declutching of the clutch device 63 through the intermediary of the linkage 65 and control handle 66, the engine can be made to operate only the blower fan 64.

An air duct supporting framework 67 is removably attached to the subframe 4 and forms a rearward extension of the latter. The framework 67 is shown in elevation in Figure 8 and in plan view in Figure 7. It comprises horizontally disposed channel members 68 and inclined members 69 which are rigidly interconnected by means of vertical rectangular frames 70 and 71. Lugs 72 are welded to the lower ends of inclined members 69 and are adapted to be bolted to upstanding brackets 73 of the subframe 4, while braces 74 are attached at 75 to the segment member 20 of the subframe 4. Also a horizontally extending tie rod 76 is attached at 77 to the frame 71 and at 78 to an upright member 79 which is secured to the central longitudinal beam 26 of the subframe 4. The framework 67 extends longitudinally and rearwardly of the subframe on the centre line thereof.

The air duct 80 of the blower system 6 forms an inverted U-shaped arrangement with the forward downwardly extending leg 81 directly communicating with the blower housing 62 and the rear vertical leg 82 supported by and rigidly secured to the rear end of the framework 67.

Referring to Figures 11 and 12, a pan-shaped member 83 is rigidly secured in horizontal position to a bracket 84 which is bolted at 85 to the back frame 70. The pan-shaped member 83 is strengthened by means of braces 86.

Referring to Figure 16, the lower end of the leg 82 of the air duct is provided with a radially outwardly extending flange 87 which is bolted against the bottom of the pan-shaped member 83 by means of bolts 88 which are disposed at the corners of a square, as shown in Figure 14. The air duct 80 is in communication with a blower head assembly, generally indicated at 90, and which is rotatable, relative to the air duct, about its vertical axis. The blower head 90 consists of an upper section 91 and a lower section 92 of rectangular cross-section and in telescopic engagement with each other. The upper end of the upper section 91 is welded to a circular plate 93 having peripheral sprocket teeth 94 and an inner circular opening 95 to which is welded a cylindrical mouth 96, the upper end of which is provided with a flange 97 having a packing ring 98 for air-tight sliding engagement with the underface of the pan-shaped member 83. An annular member 99 is supported by the four bolts 88 and engaged underneath the flange 97 to support the whole assembly of the blower head 90 from the pan-shaped member 83.

Rollers 100 are freely rotatable on bushings 101 which surround the bolts 88. The rollers 100 are in engagement with the periphery of the flange 97 and permit free rotational movement of the blower head with respect to the pan-shaped member 83. The blower head 90 is rotated about its vertical axis through a sprocket chain 102 in engagement with the sprocket teeth 94 of the annular plate 93, and hydraulic cylinder and piston units 103, shown in Figures 17 and 18.

More particularly, the units 103 are disposed within the horizontally extending channel members 68 of the framework 67 and the piston rod head thereof is provided with a pulley 104 on which the sprocket chain 102 is trained. The outer ends of the sprocket chain 102 are fixed to the members 68 at 105. The two units 103 are adapted to rotate the blower head through an angle of at least 240°. Selective means are provided for limiting the rotation of the blower head 90 either to 120° or 240°. Said means, which are shown in Figures 14 to 16 inclusive, comprise a pin 106 slidably mounted within a sleeve 107 which is rigidly secured to one corner of the pan-shaped member 83. The pin 106 is urged downwardly by means of a spring 108 and is provided with a cross pin 109 which is engageable in either one of right-angularly disposed shallow recess 110 and deep recess 111, so that the pin 106 may take an upper position or a lower position with respect to the sleeve 107. The pin 106 is disposed in the path of two short lugs 112 and two long lugs 113 arranged in a circle.

Referring to Figure 14, the short lugs 112 are secured to the annular plate 93 and project upwardly therefrom to be engaged by the pin 106, in the lowered position of the latter, upon rotation of the blower head with respect to the fixed pan-shaped member 83. In the position of the blower head with the nozzle facing towards the front of the machine and with the subframe aligned with the longitudinal axis of the machine, the lugs 112 are at equal angular distances from the pin 106 on each side thereof at 60° from said pin and consequently at 120° angle from each other. The two long lugs 113 are similarly disposed with respect to the pin 106 and they make between themselves an angle of 240° or 120° on each side of the pin 106, when the blower head is in the position defined hereinabove. Thus it will be seen that upon actuation of the hydraulic cylinder and piston units 103 and with the pin 106 in its lower position, rotation of the blower head will be limited to an angle of 120°, while in the upper position of the pin 106, the blower head will be limited to a rotation of 240°. The purpose of this selective blocking of the rotation of the blower head will be described hereinafter.

Referring to the blower head and nozzle arrangement shown in Figures 11 to 13, it will be seen that the lower section 92 of the blower head is movable up and down, with respect to the upper section 91, by means of the hydraulic piston and cylinder unit 114 which is pivoted at 115 to the lower end of arms 116 secured to the upper section 91 and annular plate 93, and pivoted at 117 to a fork 118 extending on both sides of the upper section 91 and pivoted thereto at 119. The lower section 92 is pivotally connected to the fork 118 through the intermediary of adjustable tie rods 120. The lower section 92 may be locked in raised position by means of locking pin 123 engageable with bored ears 121 and 122 secured to the lower section 92 and to the circular plate 93 respectively.

The lower section 92 of the blower head is terminated by the air nozzle 7, shown in Figure 13. Said nozzle has an elongated opening the width of which is adjustable by means of a flap 124 hinged at 125 and secured in adjusted position by means of wing nuts 126.

The engine 57 drives a hydraulic pump (not shown) for supplying hydraulic fluid under pressure to the various cylinder and piston units of the machine. The main control elements of the hydraulic circuit are located in the box 60' and have connections to the various cylinder and piston units, and a remote control box (not shown) containing electrical switches is located in the motor vehicle towing the trailer type machine, in accordance with the present invention, and is connected to the main control elements in box 60' through an electrical cable extending along the front beam 8. The control of the hydraulic circuit form part of a co-pending patent application Serial Number 688,766, filed October 7, 1957, entitled "Hydraulic Circuit Control," now abandoned.

The water spraying tube 60 is also controlled from the remote control box in the towing vehicle.

The machine, in accordance with the present invention, is operated as follows, having specific reference to the sweeping of an airport runway.

When the machine is towed to the place of use, the rotary brush 5 is in a position perpendicular to the long axis of the wheeled frame 1 and in raised position with respect to the ground; air nozzle 7 faces forwardly of the machine and is in a raised position, as shown in full line in Figures 3 and 11.

The machine is preferably operated so as to sweep and blow the snow or dust in the direction of the wind. On the runway, the engine 57 is started to run at a slow speed, then the brush and the air nozzle are lowered by operation of a remote control button in the driver's cab of the towing motor vehicle; the subframe 4 is rotated through substantially 30° to incline the brush in the wind direction with respect to the wheeled frame 1 and to simultaneously displace the air nozzle 7 transversely of the wheeled frame so as to be in a position substantially aligned with the foremost end portion of the inclined brush, as shown in dot and dash line in Figure 3. During this movement the air nozzle is also automatically rotated inwardly through substantially 30° so as to direct an air blast transversely of the whole path swept by the brush, the pin 106 having been previously disposed in a lowered position to engage the short lugs 112. The engine 53 is then accelerated by a control in the driver's cab to rotate the brush and blower at operating speed, thus the machine is ready to sweep.

At the end of the first sweep, the machine is turned back and the brush is inclined in the opposite direction together with the nozzle 7 for making a return sweep and so on.

Normally the first sweep is effected along one side of the runway close to the runway lights. If these lights are covered with snow or dust, they may be cleaned by the blower in a preliminary pass. In this preliminary pass the subframe is inclined in a direction away from the runway lights to bring the air nozzle adjacent said lights. The subframe is locked to the wheeled frame and the air nozzle is turned laterally outwardly of the machine through 120° with respect to the centre position of the nozzle, as clearly shown in dot and dash lines in Figures 3. For this purpose, means (not shown) are provided to lock the subframe to the wheeled frame and the pin 106 is raised to its upper position to allow rotation of the nozzle under the action of the cylinder units 103. The brush is also declutched from the engine 57.

When used in non-freezing weather, the water spraying tube 60 will normally be operated to eject water in front of the brush for the settling of dust.

It will be noted that the machine, in accordance with the present invention, is automatic in its operation and that the air nozzle will always be in a position to direct an air blast across the entire width of the path swept by the rotary brush irrespective of the inclination of said brush relative to the wheeled frame and direction of movement of the machine.

While a preferred embodiment in accordance with the present invention has been illustrated and described, it is understood that various modifications may be resorted to without departing from the spirit and scope of the appended claims.

I claim:

1. In a machine for simultaneously sweeping a road surface and blowing loose particles therefrom, in combination, an elongated wheeled frame having a longitudinal axis, a subframe pivotally mounted in a horizontal plane on said wheeled frame, hydraulic means for pivoting said subframe, a rotary brush and an air blower mounted on said subframe, said air blower having an air discharge nozzle mounted on said sub-frame and located at a distance behind said rotary brush and having its discharge opening directed at a slight angle downwardly to the horizontal, said nozzle being arranged for pivotal movement in a horizontal plane, and power means to operate said brush and blower, and to actuate said hydraulic means, whereby said nozzle may direct a blast of air transversely across the path swept by said rotary brush at a predetermined range of inclinations of said rotary brush with respect to the longitudinal axis of said wheeled frame.

2. A trailer type sweeping and blowing machine for simultaneously sweeping a road surface and blowing loose particles therefrom, comprising an elongated wheeled frame having a longitudinal axis, a subframe pivoted on said wheeled frame for horizontal movement on both sides of the longitudinal axis of said wheeled frame, first hydraulic means for pivoting said subframe, a rotary brush having an axle mounted forwardly of said subframe, a blower mounted on said subframe rearwardly of said rotary brush, an air discharge duct connected to said blower and extending rearwardly of said subframe, an air discharge nozzle carried by said duct and arranged for pivotal movement in a horizontal plane and having its discharge opening directed at a slight angle downwardly to the horizontal, second hydraulic means for pivoting said air discharge nozzle, and an engine mounted on said subframe for driving said blower and said rotary brush and for actuating said first and second hydraulic means, whereby said air discharge nozzle may direct a blast of air transversely across substantially the whole width of the path swept by said rotary brush at a predetermined range of inclinations of said rotary brush with respect to the longitudinal axis of said wheeled frame.

3. A trailer type sweeping and blowing machine as claimed in claim 2, wherein said nozzle is mounted for rotation with respect to said wheeled frame through at least 240° so that in any one of the transverse positions of said nozzle the same can be rotated to direct an air blast either laterally outwardly or laterally inwardly with respect to said wheeled frame.

4. A trailer type sweeping and blowing machine as claimed in claim 3, further including hydraulic means for raising and lowering said rotary brush with respect to said wheeled frame, said last named means being actuated by said engine.

5. A trailer type sweeping and blowing machine as claimed in claim 4, said engine having a drive shaft, said blower having a blower housing through which said drive shaft extends, a blower fan secured to said drive shaft and mounted within said blower housing and a driving connection between said drive shaft and said rotary brush.

6. A trailer type sweeping and blowing machine as claimed in claim 5, wherein said discharge duct extends rearwardly and downwardly with respect to said subframe, and a blower head mounted telescopically for vertical adjustment on said duct, said discharge nozzle being carried by the lower end of said blower head and hydraulic means for vertically adjusting said blower head, said last named hydraulic means being actuated by said engine.

7. A trailer type sweeping and blowing machine comprising an elongated wheeled frame consisting of a vertically disposed inverted U-shaped front beam portion having a pair of steering wheels mounted on the front leg thereof and a rear horizontal portion rearwardly extending from the lower end of the rear leg of said front beam portion, wheels mounted at the back of said rear horizontal portion, a subframe slidably supported on said rear portion and pivotally connected at the front end thereof on the rear vertical leg of said inverted U-shaped front beam, an engine mounted on said subframe, a blower housing mounted on said subframe, said engine having a drive shaft going through said blower housing, a fan mounted on said drive shaft within said blower housing, an air discharge duct connected to said blower housing and extending rearwardly of said subframe and having a downwardly extending leg at the rear end thereof, brace means between said downward leg of said discharge duct and said subframe, a telescopic blower head rotatively mounted on the rear vertical leg of said duct, a discharge nozzle carried by the telescopic section of said blower head and having its discharge opening directed at a slight angle downwardly to the horizontal, first hydraulic means to raise and lower said telescopic section, second hydraulic means to rotate said blower head and discharge nozzle about the long axis of the vertical rear leg of said duct through at least 240°, a framework pivotally mounted at the front end of said subframe for vertical raising and lowering movement with respect to said subframe, said framework extending forwardly of said subframe and on each side thereof, a rotary sweeper brush rotatively mounted on said framework and extending transversely of said wheeled frame underneath the horizontal portion of the inverted U-shaped front beam and forwardly of the rear vertical leg of said front beam, transmission means between the drive shaft of said engine and said rotary brush and third hydraulic means for effecting vertical movement of said framework, said first, second and third hydraulic means being actuated by said engine.

8. A machine as claimed in claim 7, wherein said air discharge nozzle is disposed on the longitudinal axis of said wheeled frame when said rotary brush is substantially perpendicular to said longitudinal axis and rotation of said subframe through about 30° with respect to said long axis will incline said rotary brush and transversely displace said air nozzle, the distance between said air nozzle and rotary brush being such that in said inclined position of said brush and displaced position of said nozzle, said nozzle will be longitudinally aligned with the foremost end portion of said rotary brush so as to direct an air blast across substantially the entire path swept by said brush upon forward movement of said wheeled frame.

9. A machine as claimed in claim 8, further including selective means to selectively block the rotation of the blower head with respect to the air duct through an angle of 120° to 240°.

10. A machine as claimed in claim 8, further including a clutch between the drive shaft of the engine and the transmission means to the rotary brush.

11. A machine as claimed in claim 8, wherein said air nozzle has an elongated opening and a manually adjustable baffle to vary the width of said opening.

12. A machine as claimed in claim 8, wherein said framework for mounting said rotary brush comprises two articulated parallelogram arrangements on both sides of said subframe mounted in vertical planes, one vertical side of each parallelogram arrangement consisting of a ground-engaging caster wheel assembly.

13. A machine as claimed in claim 9, wherein said selective means comprise two short lugs mounted on the blower head and spaced 120° apart and two longer lugs also mounted on said blower head and spaced 240° apart, and a pin mounted on the rear leg of the air duct in the path of said lugs, said pin having a lower position engageable with said short lugs and an upper position engageable with said long lugs.

References Cited in the file of this patent

UNITED STATES PATENTS

| | | |
|---|---|---|
| 1,211,902 | Warner | Jan. 9, 1917 |
| 1,243,516 | Harris | Oct. 16, 1917 |
| 2,548,676 | Milz et al. | Apr. 10, 1951 |
| 2,561,701 | Hurlbert | July 24, 1951 |
| 2,601,695 | Grace | July 1, 1952 |
| 2,830,510 | Mariani et al. | Apr. 15, 1958 |